United States Patent
Yamaguchi et al.

(10) Patent No.: US 12,136,853 B2
(45) Date of Patent: Nov. 5, 2024

(54) ELECTRIC-ROTATING-MACHINE ROTOR AND MANUFACTURING METHOD THEREFOR

(71) Applicant: Mitsubishi Electric Corporation, Tokyo (JP)

(72) Inventors: Kohei Yamaguchi, Tokyo (JP); Masafumi Okazaki, Tokyo (JP); Satoru Akutsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 204 days.

(21) Appl. No.: 17/771,573

(22) PCT Filed: Dec. 9, 2019

(86) PCT No.: PCT/JP2019/048059
§ 371 (c)(1),
(2) Date: Apr. 25, 2022

(87) PCT Pub. No.: WO2021/117087
PCT Pub. Date: Jun. 17, 2021

(65) Prior Publication Data
US 2022/0416596 A1    Dec. 29, 2022

(51) Int. Cl.
*H02K 1/27*     (2022.01)
*H02K 1/276*    (2022.01)
*H02K 15/03*    (2006.01)

(52) U.S. Cl.
CPC ............. *H02K 1/276* (2013.01); *H02K 15/03* (2013.01)

(58) Field of Classification Search
CPC .... H02K 1/276; H02K 15/03; H02K 2201/09; H02K 2213/03; H02K 1/28
See application file for complete search history.

(56) References Cited

U.S. PATENT DOCUMENTS

2010/0139999 A1* 6/2010 Park ................. H02K 7/102
                                                    310/114
2015/0076956 A1   3/2015 Sakamoto
(Continued)

FOREIGN PATENT DOCUMENTS

DE          69507996 T2    9/1999
DE      102018102948 A1    8/2019
(Continued)

OTHER PUBLICATIONS

International Search Report for PCT/JP2019/048059, dated Feb. 18, 2020.
(Continued)

*Primary Examiner* — Thomas Truong
(74) *Attorney, Agent, or Firm* — Sughrue Mion, PLLC; Richard C. Turner

(57) ABSTRACT

An electric-rotating-machine rotor has a rotor core in which ring-shaped plate materials that are each magnetic materials are stacked in an axial direction and a shaft-press-fitted into an inner circumferential surface of the rotor core; the inner circumferential surface has a first press-fitting portion that is an axial-direction section into which the shaft is inserted and a second press-fitting portion that is an axial-direction section adjacent to the first press-fitting portion and into which the shaft is inserted with an interference larger than that of the first press-fitting portion, and the shaft is press-fitted into the inner circumferential surface of the rotor core from the first press-fitting portion side. As a result, the electric-rotating-machine rotor in which no gap is caused between the stacked plate materials can be realized at low cost. Moreover, it is made possible to produce the electric-rotating-machine rotor through simple processes and at low cost.

11 Claims, 12 Drawing Sheets

(56) References Cited

U.S. PATENT DOCUMENTS

2017/0047827 A1* 2/2017 Fubuki ................ H02K 15/028
2020/0039203 A1* 2/2020 Izumi ........................ H01F 3/02
2021/0067014 A1 3/2021 Nagasugi et al.

FOREIGN PATENT DOCUMENTS

| EP | 2833518 A1 | | 2/2015 |
|---|---|---|---|
| JP | 58-059337 U | | 4/1983 |
| JP | 58-86848 A | | 5/1983 |
| JP | 2005-151648 A | | 6/2005 |
| JP | 2006129583 A | * | 5/2006 |
| JP | 2011-019298 A | | 1/2011 |
| JP | 2019-161697 A | | 9/2019 |

OTHER PUBLICATIONS

Extended European Search Report dated Nov. 11, 2022 in Application No. 19955667.1.
Office Action issued Apr. 11, 2023 in Japanese Application No. 2021-563452.
Chinese Office Action dated Jul. 10, 2024 in Application No. 201980102727.1.

* cited by examiner

ELECTRIC-ROTATING-MACHINE ROTOR AND MANUFACTURING METHOD THEREFOR

CROSS REFERENCE TO RELATED APPLICATIONS

This application is a National Stage of International Application No. PCT/JP2019/048059 filed Dec. 9, 2019.

TECHNICAL FIELD

The present disclosure relates to an electric-rotating-machine rotor and to a manufacturing method therefor.

BACKGROUND ART

In a conventional electric-rotating-machine rotor, a rotor core has been pinched by end plates provided at the axis-direction both end portions of the rotor core and has been fixed through riveting (for example, refer to Patent Document 1).

CITATION LIST

Patent Literature

[Patent Document 1] Japanese Patent Application Laid-Open No. 2011-19298

The conventional electric-rotating-machine rotor, disclosed in Patent Document 1, is configured in such a way that the rotor core, which includes stacked steal plate materials (core), is pinched by the end plates provided at the axis-direction both end portions of the rotor core and is fixed through riveting; thus, there has been a problem that because the number of components and the number of assembly processes are large, the production costs for the rotor increases. Moreover, in the case of a configuration in which a rotor core is fixed to the shaft only through press-fitting of the shaft in the rotor core, without utilizing any end plate and any rivet, there has been a problem that a warp of a plate material causes a gap between the stacked plate materials, which results in vibration or noise.

SUMMARY OF INVENTION

The objective of the present disclosure is to solve these problems, to realize at low cost an electric-rotating-machine rotor in which no gap is caused between stacked plate materials in the rotor core, and to produce the electric-rotating-machine rotor through simple processes and at low cost.

Solution to Problem

An electric-rotating-machine rotor according to the present disclosure includes a rotor core in which ring-shaped plate materials that are each magnetic materials are stacked in an axial direction, and a shaft press-fitted into an inner circumferential surface of the rotor core; the inner circumferential surface has a first press-fitting portion that is an axial-direction section into which the shaft is inserted and a second press-fitting portion that is an axial-direction section adjacent to the first press-fitting portion and into which the shaft is inserted with an interference larger than that of the first press-fitting portion, and the shaft is press-fitted into the inner circumferential surface of the rotor core from the first press-fitting portion side.

A manufacturing method for an electric-rotating-machine rotor, according to the present disclosure, includes a step of forming a first press-fitting portion by stacking ring-shaped first plate materials that are magnetic materials each of which has an inner diameter smaller than an outer diameter of a shaft, a step of forming the second press-fitting portion by stacking ring-shaped second plate materials that are magnetic materials each of which has an inner diameter smaller than that of the first plate material, a step of stacking the first press-fitting portion and the second press-fitting portion, and a step of press-fitting the shaft into the first press-fitting portion and the second press-fitting portion from the first press-fitting portion side.

Advantage of Invention

The present disclosure makes it possible to realize at low cost an electric-rotating-machine rotor configured in such a way that no gap is caused between stacked plate materials. In addition, the present disclosure makes it possible to produce the electric-rotating-machine rotor through simple processes and at low cost.

DESCRIPTION OF EMBODIMENTS

1. Embodiment 1

Figure 1:
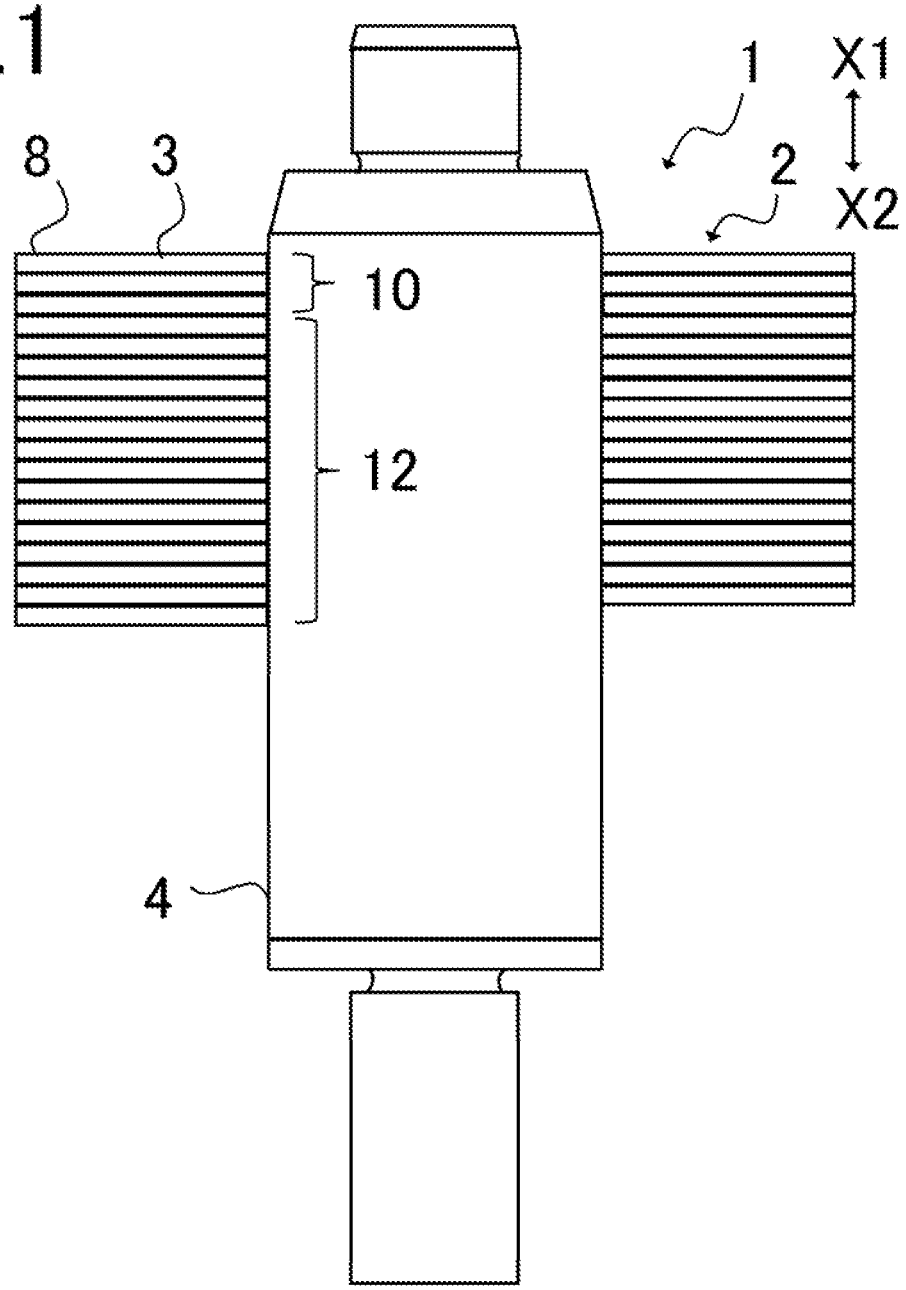
FIG. 1 is a cross-sectional view illustrating an electric-rotating-machine rotor according to Embodiment 1.
Figure 2:
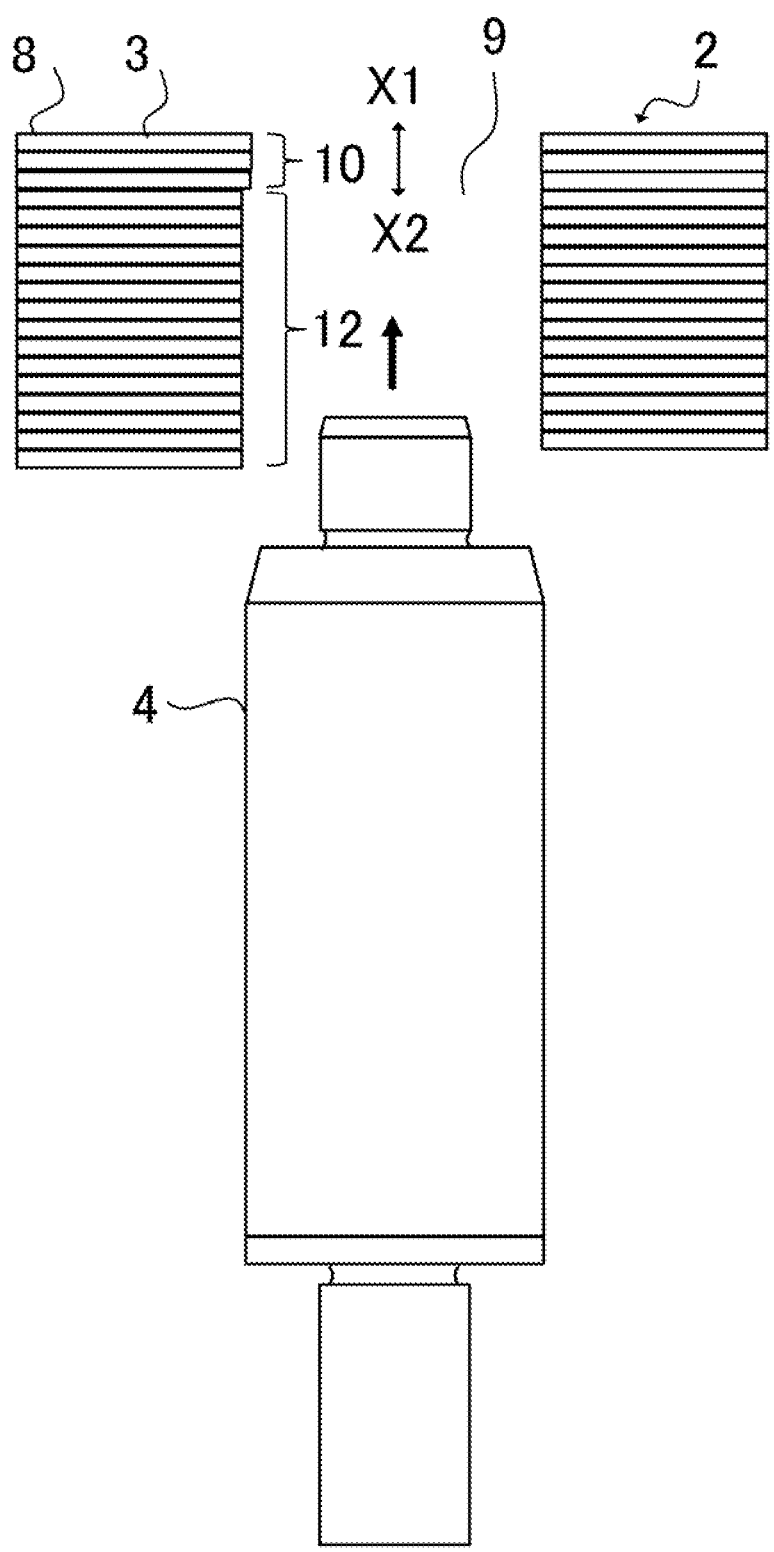
FIG. 2 is a cross-sectional view illustrating the direction in which a shaft is press-fitted into an electric-rotating-machine rotor core according to Embodiment 1.
Figure 3:
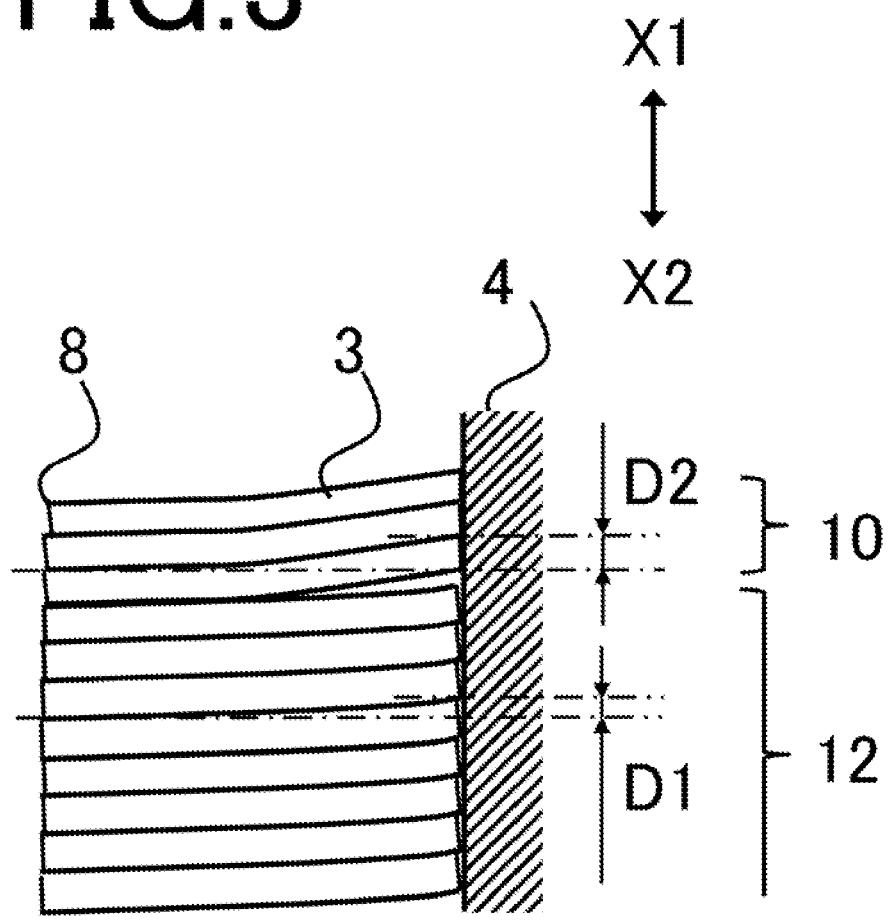
FIG. 3 is a cross-sectional view illustrating respective deformations of plate materials of a first press-fitting portion and a second press-fitting portion of the electric-rotating-machine rotor core according to Embodiment 1.

Hereinafter, an electric-rotating-machine rotor 1 according to Embodiment 1 will be explained with reference to the drawings. FIG. 1 is a cross-sectional view illustrating the electric-rotating-machine rotor 1 according to Embodiment 1; FIG. 1 illustrates a cross section of the rotor 1, taken along a plane that passes through the axis of the rotor 1. FIG. 2 is a cross-sectional view illustrating a direction in which a shaft 4 is press-fitted into an electric-rotating-machine rotor core 2 according to Embodiment 1. FIG. 3 is a cross-sectional view illustrating respective deformations of plate materials of a first press-fitting portion 12 and a second press-fitting portion 10 of the electric-rotating-machine rotor core 2 according to Embodiment 1.

<Press-Fitting of Shaft into Rotor Core>

In FIG. 1, the rotor 1 is pivotably supported by unillustrated bearings inside an unillustrated stator so as to be included in an inner-rotor electric rotating machine. The rotor core 2 is formed of stacked plate materials 3 that are electromagnetic steel plates and ring-shaped; the rotor core 2 is fixed to the shaft 4, which is the rotation axle of the electric rotating machine, through press-fitting. Two or more permanent magnets are provided in the rotor core 2 so as to be included in a permanent-magnet-embedded rotor, i.e., an IPM (Interior Permanent Magnet)-method rotor.

The rotor core 2 is formed of the stacked plate materials 3 that are electromagnetic steel plates and ring-shaped; as the plate material 3, a magnetic material such as iron, a permalloy, or an amorphous magnetic alloy is utilized. In the inner circumferential surface of the rotor core 2, a central hole 9 into which the shaft 4 is press-fitted is formed. At the first press-fitting portion 12, which is an axial-direction section into which the shaft 4 is press-fitted at first and is fixed through press-fitting, the size of the central hole 9 is slightly smaller than the outer diameter of the shaft 4. The shaft 4 is press-fitted into the first press-fitting portion 12. At the second press-fitting portion 10, which is an axial-direction section that is adjacent to the first press-fitting portion 12 and into which the shaft 4 is press-fitted after the first press-fitting portion 12, the inner diameter is set to be smaller than that of the first press-fitting portion 12; that is to say, the interference is set to be large.

Therefore, the pressing force that presses the shaft on the inner surface of the rotor core 2 is larger at the second press-fitting portion 10 than that at the first press-fitting portion 12. As a result, because there is produced a stress with which the peripheral portions of the plate materials 3 in the second press-fitting portion 10 press the peripheral portions of the plate materials 3 in the first press-fitting portion 12, there can be obtained the electric-rotating-machine rotor 1 in which no gap is caused between the stacked plate materials 3. The details thereof will be explained below.

FIG. 2 illustrates the direction in which the shaft 4 is press-fitted into the rotor core 2. Here, the direction from the first press-fitting portion 12 of the rotor core 2 to the second press-fitting portion 10 will be defined as an axial-direction first side X1, and the direction opposite thereto will be defined as an axial-direction second side X2. The shaft 4 is press-fitted toward the axial-direction first side X1. The shaft 4 is press-fitted into the first press-fitting portion 12 at first, and then is press-fitted into the second press-fitting portion 10, while passing through the first press-fitting portion 12. Because the press-fitting direction produces a stress with which the peripheral portions of the plate materials 3 in the second press-fitting portion 10 press the peripheral portions of the plate materials 3 in the first press-fitting portion 12, there can be obtained an electric-rotating-machine rotor in which no gap is caused between the stacked plate materials.

<Deformation of Plate Material>

The plate material 3 is formed of an electromagnetic steel plate having a plate thickness of 0.5 mm; however, the plate thickness is not limited thereto. When the shaft 4 is press-fitted into the central hole 9 in the plate material 3, a stress is produced in the press-fitting direction in the plate material 3 and hence a displacement amount is caused toward the axial-direction first side X1 with respect to a plane perpendicular to the shaft 4. That is to say, in the press-fitting direction, there is produced a stress with which the shape of the plate material 3 is deformed to a disc-spring shape in such a way that the plate material 3 near to the shaft becomes a convex. In FIG. 3, this deformation is explained. At the contact point between the plate material 3 and the shaft 4, due to restoring force of the plate material 3 that has been distorted toward the axial-direction first side X1, force having respective components in directions toward the axial-direction second side X2 and toward the radially inside presses the shaft 4.

Force of the plate material 3 pressing the shaft 4 becomes reactive force and presses the plate material 3; thus, the shape of the plate material 3 is deformed to a plate-spring shape. Due to the plate material 3 that intends to fall at the portion thereof making contact with the shaft 4, the peripheral portion of the plate material 3 causes a stress toward the axial-direction second side X2. This stress is larger at the second press-fitting portion 10 than that at the first press-fitting portion 12; thus, in the magnetic-pole portion 8, which is the peripheral portion of the plate material 3 of the second press-fitting portion 10, the magnetic-pole portion 8 of the second press-fitting portion 10 presses the magnetic-pole portion 8 of the first press-fitting portion 12 toward the axial-direction second side X2. As a result, there can be obtained the electric-rotating-machine rotor 1 in which no gap is caused between the stacked plate materials 3.

The plate material 3 of the second press-fitting portion 10 has a larger interference than the plate material 3 of the first press-fitting portion 12 has. In other words, the inner diameter of the plate material 3 of the second press-fitting portion 10 is smaller than that of the plate material 3 of the first press-fitting portion 12. Accordingly, the stress that causes the disc-shaped deformation becomes large; thus, as illustrated in FIG. 3, there is caused a second displacement amount D2 larger than a first displacement amount D1 of the first press-fitting portion 12.

In the plate material 3 of the first press-fitting portion 12, the radially-inside end portion thereof is displaced by the first displacement amount D1 toward the axial-direction first side X1, with respect to the radially-outside end portion thereof; in the plate material 3 of the second press-fitting portion 10, the radially-inside end portion thereof is displaced by the second displacement amount D2 toward the axial-direction first side X1, with respect to the radially-outside end portion thereof; the second displacement amount D2 of the second press-fitting portion becomes larger than the first displacement amount D1 of the first press-fitting portion.

In the first press-fitting portion 12, due to the first displacement amount D1, a pressure that intends to press down the magnetic-pole portion 8, which is the peripheral portion of the plate material 3, is caused. In second press-fitting portion 10, due to the second displacement amount D2 that is larger than the first displacement amount D1, a larger pressure that intends to press down the magnetic-pole portion 8, which is the peripheral portion of the plate material 3, is caused. As a result, on the magnetic-pole portion 8, which is the peripheral portion of the plate material 3 of the second press-fitting portion 10, there acts force that presses the foregoing magnetic-pole portion 8 against the magnetic-pole portion 8, which is the peripheral portion of the plate material 3 of the first press-fitting portion 12. As a result, there can be obtained the electric-rotating-machine rotor 1 in which no gap is caused between the stacked plate materials 3.

Because the rotor core 2 is formed of the stacked plate materials 3, there exists a minute gap between the stacked plate materials 3. Because the stacking gap is of several micrometers, no problem is caused, in general; however, press-fitting of the shaft or the like changes the balance among the stresses in the plate materials 3 and hence the stacking gap may expand, especially in the periphery of the end portion of the plate material 3. The expansion of the stacking gap appears conspicuously in the magnetic-pole portion 8 of the peripheral portion and may become several hundred micrometers. When such a large axial-direction gap is caused in the magnetic-pole portion 8, the magnetic-pole portion 8 is vibrated by electromagnetic force when the electric rotating machine operates; thus, axial-direction collision between the magnetic-pole portions 8 may generate noise. In this regard, however, in the configuration of the present embodiment, as described above, the stresses to be generated in the stacked plate materials 3 at the end portion of the rotor core 2 are intentionally changed and hence a stress that performs pressing against the magnetic-pole portion 8 in the periphery of the axial-direction end portion, so that no stacking gap of several hundred micrometers is caused between the magnetic-pole portions 8.

In the case where in a conventional electric rotating machine, the rotor core 2 is fixed by being pinched from the both ends thereof by use of end plates and rivets, it is made possible to prevent such a stacking gap causing noise from occurring; however, there has been a problem that because the number of components and the number of assembly processes increase, the production cost rises.

In the electric-rotating-machine rotor 1 configured according to Embodiment 1, the stacking gap between the plate materials 3 in the peripheral portions of the rotor core 2 can be prevented from expanding, without utilizing any end plate and rivet. It is made possible to suppress noise in the electric rotating machine that is caused by vibration of the magnetic-pole portion of the periphery portion in the rotor core 2, due to electromagnetic force at a time when the electric rotating machine operates; concurrently, the production can be facilitated and the cost can be reduced.

In addition, although the explanation has been made with a permanent-magnet-embedded (IPM) method, as the configuration of the electric-rotating-machine rotor 1, in which noise caused by vibration of the magnetic-pole portion 8 is liable to occur, the configuration of the rotor 1 is not limited thereto; regardless of the method of the rotor, the effect corresponding to each of the methods, such as an SPM (Surface Permanent Magnet) method, a consequent method, and an inset method, can be obtained.

<Manufacturing Method>

The manufacturing method for the electric-rotating-machine rotor 1, disclosed in Embodiment 1, will be explained.

The electric-rotating-machine rotor 1 according to Embodiment 1 can be manufactured through the manufacturing method including (1) a step of forming the first press-fitting portion 12 by stacking ring-shaped first plate materials that are magnetic materials each of which has an inner diameter smaller than the outer diameter of the shaft 4, (2) a step of forming the second press-fitting portion 10 by stacking ring-shaped second plate materials that are magnetic materials each of which has an inner diameter smaller than that of the first plate material, (3) a step of forming the rotor core 2 by stacking the stacked first plate materials having the first press-fitting portion 12 and the stacked second plate materials having the second press-fitting portion 10, and (4) a step of press-fitting the shaft 4 into the first press-fitting portion 12 and the second press-fitting portion 10 from the first press-fitting portion 12 side.

The order of the step (1) and the step (2) does not matter. In addition, the steps (1), (2), and (3) may concurrently be performed. For example, it may be allowed that after stacking the first plate materials, the second plate materials are stacked thereon. It may also be allowed that after stacking the second plate materials, the first plate materials are stacked thereon. The steps (1), (2), and (3) correspond to preparation for the rotor core 2; the step (4) corresponds to press-fitting of the rotor core 2 into the shaft 4.

The foregoing manufacturing method makes it possible that in the electric-rotating-machine rotor 1 according to Embodiment 1, the stacking gap between the plate materials 3 in the peripheral portions of the rotor core 2 is prevented from expanding, without utilizing any end plate and rivet. It is made possible to suppress noise in the electric rotating machine that is caused by vibration of the magnetic-pole portion 8 of the periphery portion in the rotor core 2, due to electromagnetic force at a time when the electric rotating machine operates; concurrently, because no process of assembling a rivet is not required, the production can be facilitated and the cost can be reduced.

2. Embodiment 2

Figure 4:
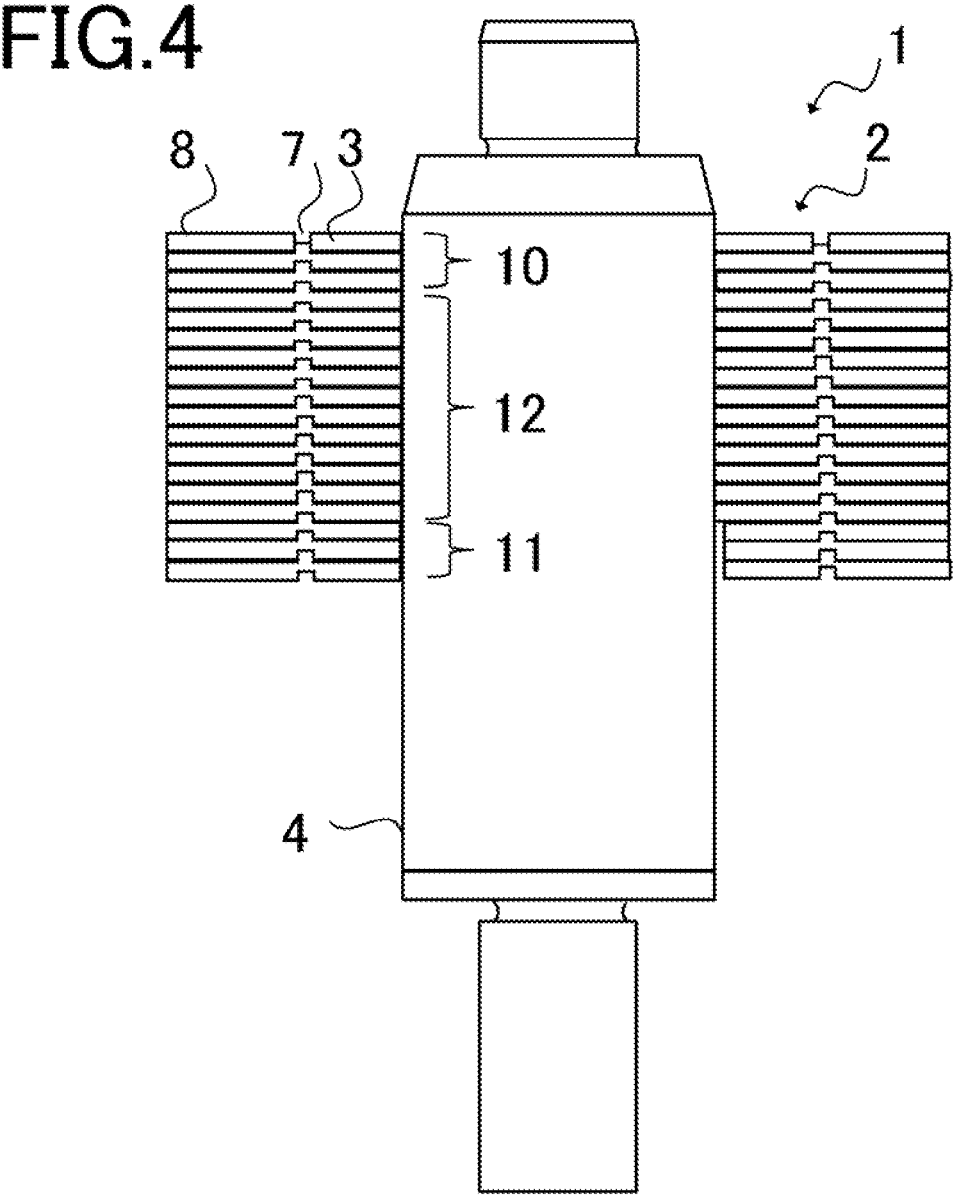
FIG. 4 is a cross-sectional view illustrating an electric-rotating-machine rotor according to Embodiment 2.
Figure 5:
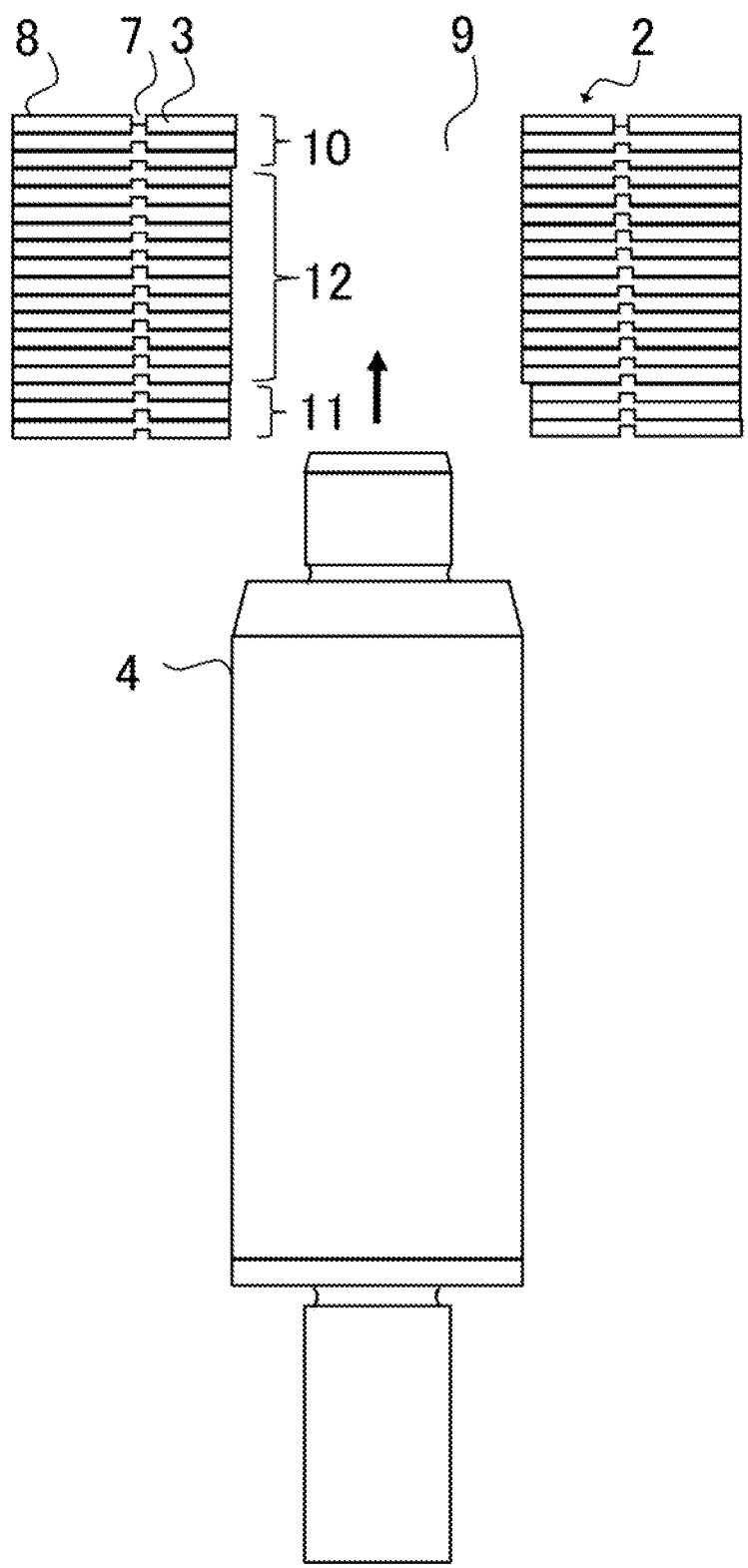
FIG. 5 is a cross-sectional view illustrating the direction in which a shaft is press-fitted into an electric-rotating-machine rotor core according to Embodiment 2.
Figure 6:
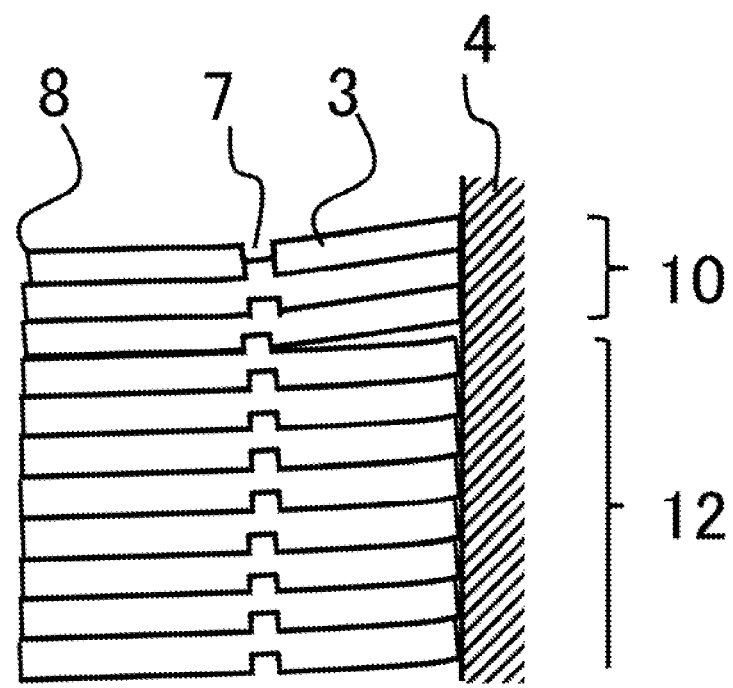
FIG. 6 is a cross-sectional view illustrating respective deformations of plate materials of a first press-fitting portion and a second press-fitting portion of the electric-rotating-machine rotor core according to Embodiment 2.
Figure 7:
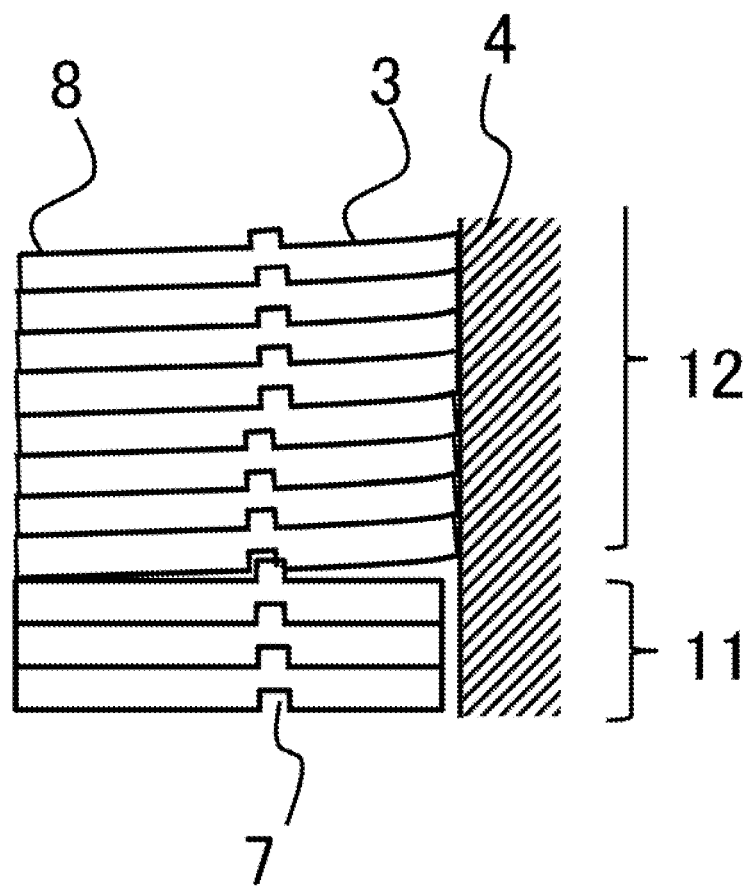
FIG. 7 is a cross-sectional view illustrating respective deformations of plate materials of the first press-fitting portion and a non-press-fitting portion of the electric-rotating-machine rotor core according to Embodiment 2.

Hereinafter, an electric-rotating-machine rotor 1 according to Embodiment 2 will be explained with reference to the drawings. FIG. 4 is a cross-sectional view illustrating the electric-rotating-machine rotor 1 according to Embodiment 2. FIG. 5 is a cross-sectional view illustrating the direction in which the shaft 4 is press-fitted into an electric-rotating-machine rotor core 2 according to Embodiment 2. FIG. 6 is a cross-sectional view illustrating respective deformations of plate materials 3 of a first press-fitting portion 12 and a second press-fitting portion 10 of the electric-rotating-machine rotor core 2 according to Embodiment 2. FIG. 7 is a cross-sectional view illustrating respective deformations of the plate materials 3 of the first press-fitting portion 12 and non-press-fitting portion 11 of the electric-rotating-machine rotor core 2 according to Embodiment 2.

The electric-rotating-machine rotor 1 according to Embodiment 2 is different from the electric-rotating-machine rotor 1 according to Embodiment 1 in that the ring-shaped plate material 3 that is a magnetic material and included in the rotor core has a recessed portion in one side and a protruding portion at the other side and in that the recessed portion and the protruding portion of the respective plate materials 3 that are adjacent to each other are fitted with and fixed to each other.

In the rotor core 2 in each of FIGS. 4 through 7, the recessed portion and the protruding portion of the respective plate materials 3 are fitted with and fixed to each other. It is referred to as fixing through blanking-type crimping that the recessed portion and the protruding portion are fitted with and fixed to each other. The blanking-type crimping may be referred to also as dowel crimping, protrusion crimping, round crimping, or V-crimping; the blanking-type crimping is a technology utilized when flat plates are stacked and fixed with one another. In the present embodiment, the blanking-type crimping is a technology in which a small-diameter cylindrical columnar shape is punched out in the plate material 3 and then the recessed portion and the protruding portion of the respective adjacent plate materials are fitted with and fixed to each other. The dowel or the protrusion may be not cylindrical columnar but round-tip cylindrical columnar, conical, polygonal columnar, round-tip polygonal columnar, or polygonal pyramidal. The cross section of the dowel or the protrusion may be ellipsoidal or rectangular. The dowel or the protrusion may be added through a method other than pressing, such as casting, forging, welding, or cutting.

Each of FIGS. 4 through 7 illustrates the appearance in which the plate materials 3 are stacked and fixed with one another through blanking-type crimping. The topmost-layer plate material 3 in each of FIGS. 4 through 6 has no protruding portion, and the recessed portion thereof is replaced by a through hole.

Because the rotor core 2 is formed of the plate materials 3 stacked through blanking-type crimping, there exists a minute gap between the stacked plate materials 3. Because the stacking gap is of several micrometers, no problem is caused, in general; however, press-fitting of the shaft or the like changes the balance among the stresses in the plate materials 3 and hence the stacking gap may expand, especially around the periphery portion of the plate material 3. The expansion of the stacking gap appears conspicuously in the magnetic-pole portion 8 at the outer diameter side and may become several hundred micrometers. Because at the inner diameter side, there exists a crimping position 7 of the blanking-type crimping, deformation in which the outer diameter side opens with the crimping position 7 as a fulcrum becomes one of the contributing factors of the expansion. When such a large axial-direction gap is caused in the magnetic-pole portion 8, the magnetic-pole portion 8 is vibrated by electromagnetic force when the electric rotating machine operates; thus, axial-direction collision between the magnetic-pole portions 8 may generate noise. In this regard, however, in the configuration of the present embodiment, as described above, the stresses to be generated in the stacked cores at the peripheral portion of the rotor core 2 are intentionally changed and hence a stress that performs pressing against the magnetic-pole portion 8 in the periphery of the axial-direction end portion, so that no stacking gap of several hundred micrometers is caused between the magnetic-pole portions 8.

The electric-rotating-machine rotor 1 according to Embodiment 2 has the non-press-fitting portion 11 that is an axial-direction section, adjacent to the first press-fitting portion 12 and opposite to the second press-fitting portion 10, in the inner circumferential surface thereof and whose inner diameter is larger than the outer diameter of the shaft 4.

The dimension of the central hole 9 at the end portion where the shaft of the rotor core 2 in FIG. 4 is inserted at first is set to be larger than the outer diameter of the shaft 4; the foregoing end portion forms the non-press-fitting portion 11 where the shaft 4 is not press-fitted. FIG. 5 illustrates the direction in which the shaft 4 is press-fitted into the rotor core 2; the shaft 4 is press-fitted thereinto in the direction of the arrow in the drawing.

Next, the operation and the effect of the rotor 1 according to the present embodiment, configured in such a manner as described above, will be explained. The plate material 3 according to Embodiment 2 is formed of an electromagnetic steel plate having a plate thickness of 0.5 mm; when the shaft 4 is press-fitted into the central hole 9 in the thin plates, a stress with which the shape of the thin plate is deformed to a disc-spring shape is produced in the thin plate in such a way that the central portion thereof becomes a convex in the press-fitting direction. This stress does not act on the plate material 3 of the non-press-fitting portion 11 and hence the plate material 3 of the non-press-fitting portion 11 is left flat. In the plate material 3 of the first press-fitting portion 12 in the axial-direction central portion, there is produced a stress with which the shape of the plate material 3 is deformed to a disc-spring shape; as schematically illustrated in FIG. 7, although the deformation is minute, the shape of the plate material 3 is deformed from a flat shape to a disc-spring shape. As a result, force that presses the magnetic-pole portion 8 of the first press-fitting portion 12 against the magnetic-pole portion 8 of the non-press-fitting portion 11 acts on the magnetic-pole portion 8 of the first press-fitting portion 12.

The shaft 4 is press-fitted into the rotor core 2 in such a way that the magnetic-pole portions 8 of the plate materials 3 closely adhere to one another, so that the rotor core 2 is fixed. While being fixed through blanking-type crimping at the crimping position 7, the non-press-fitting portion 11 is fixed in such a manner as illustrated in FIG. 7, due to deformation, caused by the press-fitting, of the portion of the first press-fitting portion 12 that makes contact with the shaft 4. Accordingly, because the peripheral portion of the plate material 3 in the first press-fitting portion 12 and the peripheral portion of the plate material 3 in the non-press-fitting portion 11 are pressed against each other, a closing stress acts on each of the foregoing peripheral portions; thus, it is made possible to prevent the stacking gap between the peripheral portions of the plate materials 3 from expanding.

3. Embodiment 3

Figure 8:
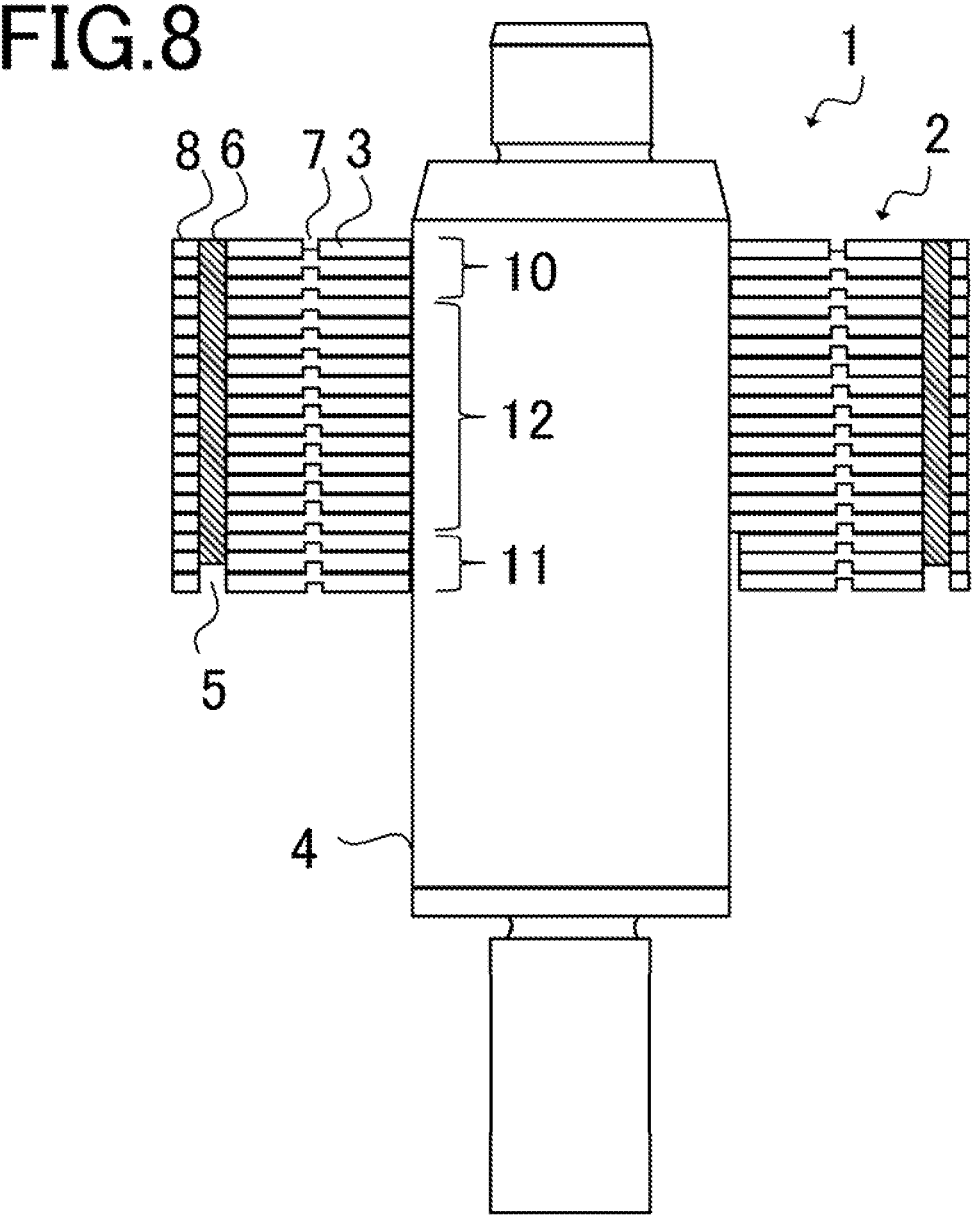
FIG. 8 is a cross-sectional view illustrating an electric-rotating-machine rotor according to Embodiment 3.
Figure 9:
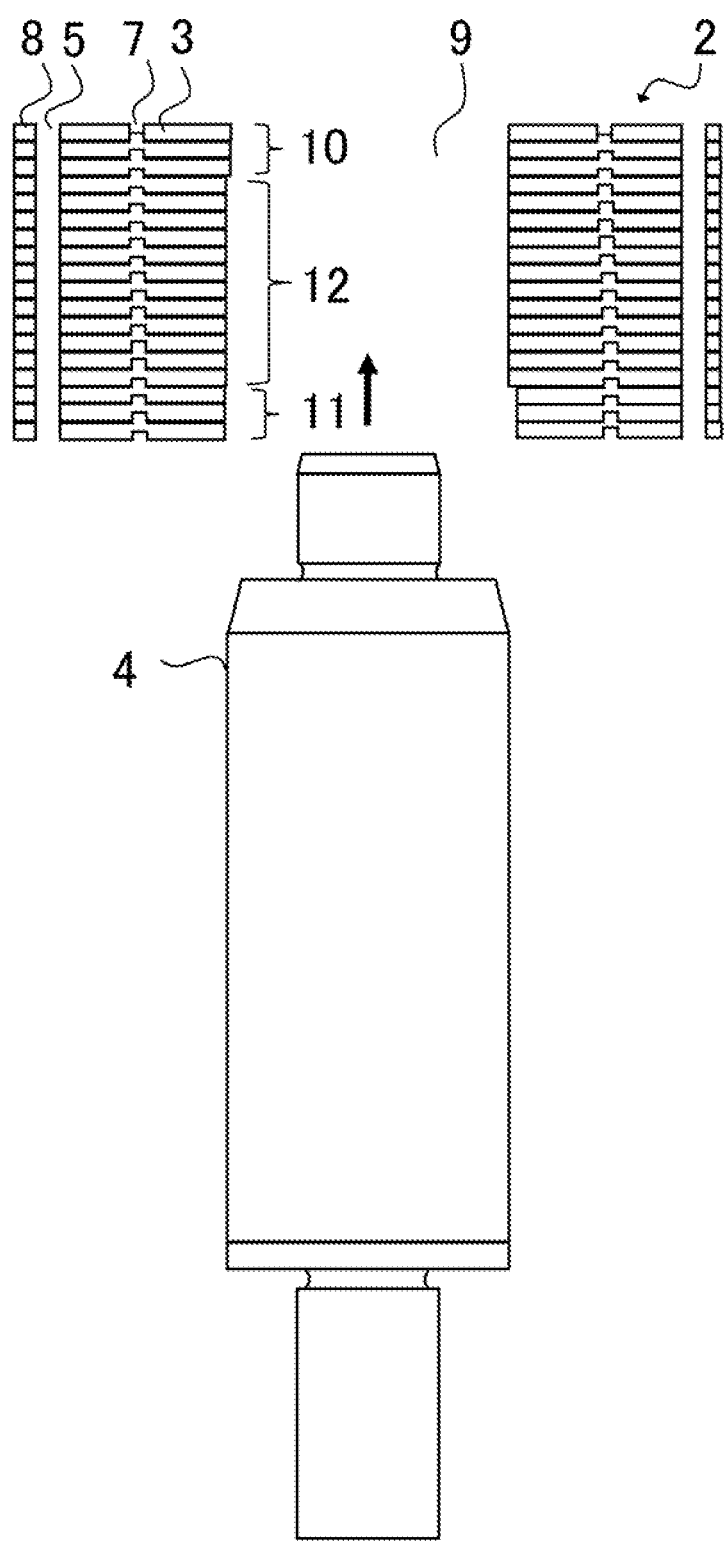
FIG. 9 is a cross-sectional view illustrating the direction in which a shaft is press-fitted into an electric-rotating-machine rotor core according to Embodiment 3.
Figure 10:
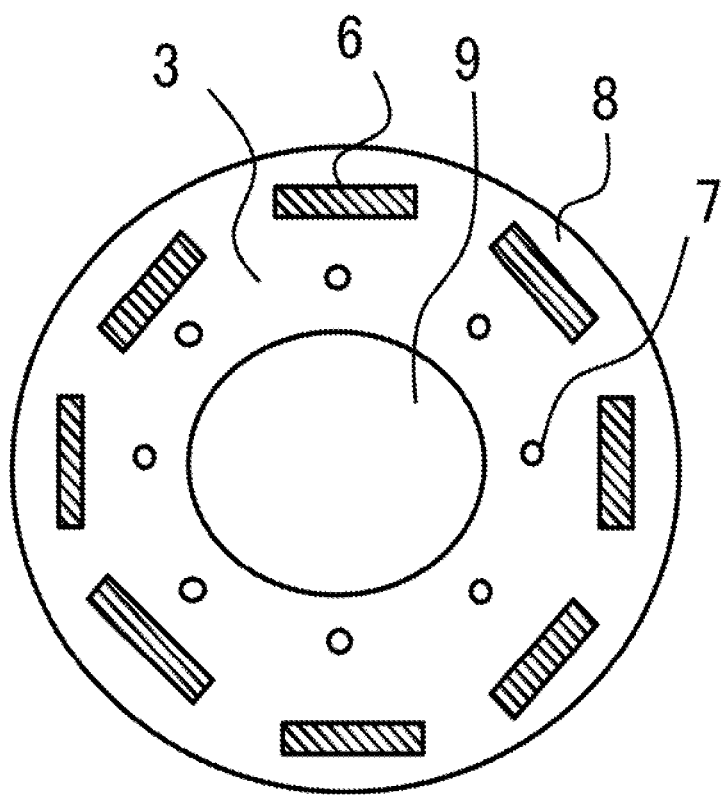
FIG. 10 is a cross-sectional view illustrating portions where magnets of the electric-rotating-machine rotor according to Embodiment 3 are inserted.
Figure 11:
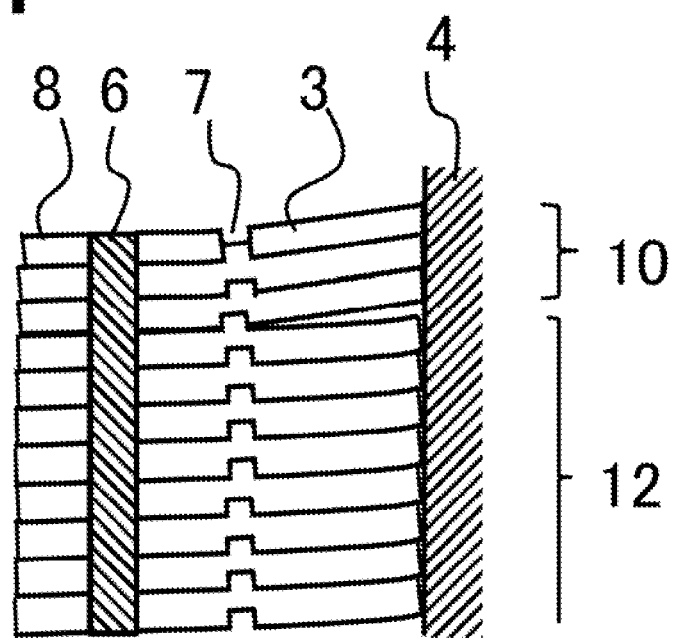
FIG. 11 is a cross-sectional view illustrating respective deformations of plate materials of a first press-fitting portion and a second press-fitting portion of the electric-rotating-machine rotor core according to Embodiment 3.
Figure 12:
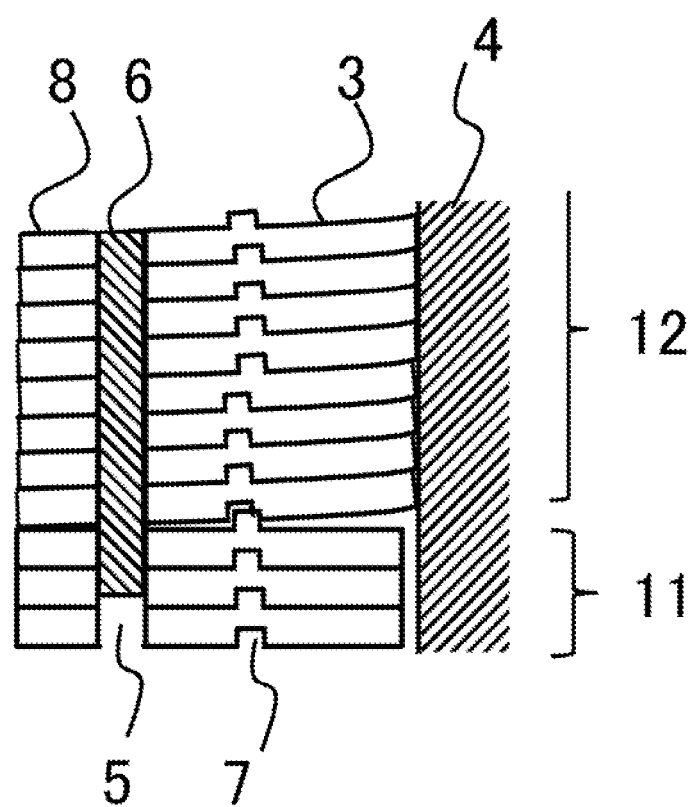
FIG. 12 is a cross-sectional view illustrating respective deformations of plate materials of the first press-fitting portion and a non-press-fitting portion of the electric-rotating-machine rotor core according to Embodiment 3.

Hereinafter, an electric-rotating-machine rotor 1 according to Embodiment 3 will be explained with reference to the drawings. FIG. 8 is a cross-sectional view illustrating the electric-rotating-machine rotor 1 according to Embodiment 3. FIG. 9 is a cross-sectional view illustrating the direction in which the shaft 4 is press-fitted into an electric-rotating-machine rotor core 2 according to Embodiment 3. FIG. 10 is a cross-sectional view illustrating portions where magnets of the electric-rotating-machine rotor 1 according to Embodiment 3 are inserted. FIG. 11 is a cross-sectional view illustrating respective deformations of plate materials 3 of a first press-fitting portion 12 and a second press-fitting portion 10 of the electric-rotating-machine rotor core 2 according to Embodiment 3. FIG. 12 is a cross-sectional view illustrating respective deformations of the plate materials 3 of the first press-fitting portion 12 and non-press-fitting portion 11 of the electric-rotating-machine rotor core 2 according to Embodiment 3.

In Embodiment 3, there is disclosed a mode in which an air gap 5, which is a magnet insertion hole, is provided in the rotor core 2 in parallel with the shaft 4 and a magnet 6 is inserted in the air gap 5. As the magnet 6, a permanent magnet is utilized. In each of FIGS. 8 through 10, a plurality of the air gaps 5 is provided in the rotor core 2 and two or more magnets 6 are inserted into the respective air gaps 5, so that a permanent-magnet-embedded rotor, i.e., a so-called IPM-method rotor is configured.

FIG. 9 illustrates the direction in which the shaft 4 is press-fitted into the rotor core 2; the shaft 4 is press-fitted thereinto in the direction of the arrow in the drawing. At this time point, the magnet 6 has not been inserted into the air gap 5 in the rotor core 2. Each of FIGS. 8 and 10 is a cross-sectional view, taken along a cross section vertical to the shaft 4, that illustrates a state where the magnet 6 is inserted into the air gap 5. The case where the magnet 6 is a flat rectangular parallelopiped is illustrated.

Inserting the magnet 6 into the air gap 5 contributes to fixation of the plate material 3 included in the rotor core 2. That is because when the magnet 6 is inserted thereinto, the magnet 6 makes contact with the plate material 3 and hence the magnetic-pole portion 8, which is the peripheral portion of the plate material 3, can be prevented from moving and vibrating. Moreover, inserting the magnet 6 into the air gap 5 can contribute to maintaining a closing stress in the magnetic-pole portions 8, which are the peripheral portions of the plate materials 3 between the first press-fitting portion 12 and the second press-fitting portion 10, or a closing stress in the magnetic-pole portions 8, which are the peripheral portions of the plate materials 3 between the first press-fitting portion 12 and the non-press-fitting portion 11.

In addition, Embodiment 3 discloses a mode in which the air gap 5 is provided in the rotor core 2 in such a way as to be in parallel with the shaft 4, in which the magnet 6 is inserted into the air gap 5, and in which one end portion of the magnet 6 is provided in the region where the non-press-fitting portion 11 exists in the radial direction of the rotor core 2. As the magnet 6, a permanent magnet is utilized. In FIG. 8, a plurality of the air gaps 5 is provided in the rotor core 2, two or more magnets 6 are inserted into the respective air gaps 5, and the end portion of the magnet 6 exists in the region of the non-press-fitting portion 11, so that a permanent-magnet-embedded rotor, i.e., a so-called IPM-method rotor is configured. The magnet 6 is inserted into the air gap 5, for example, from the second press-fitting portion 10 side.

The axial-direction length of the magnet 6 is smaller than that of the rotor core 2 so that the magnet 6 does not run off the edge of the rotor core 2. Setting is made in such a way that after the insertion of the magnet 6, the endface of the magnet 6 at the non-press-fitting portion 11 side of the rotor core 2 falls within a range of the axial-direction length of the non-press-fitting portion 11. Accordingly, it is facilitated that when the magnet is fixed at a place where the second press-fitting portion exists and that is close to the rotor-core end portion, setting can be made in such a way that the magnet does not run off the edge of the rotor core; thus, it is made possible to obtain the rotor 1 that has a high assembly efficiency and a high quality.

In addition, Embodiment 3 discloses a mode in which the air gap 5 is provided in the rotor core 2 in such a way as to be in parallel with the shaft 4, in which the magnet 6 is inserted into the air gap 5, and in which the recessed portion and the protruding portion of the plate material 3 are provided more close to the center axis than the magnet 6 is. As the magnet 6, a permanent magnet is utilized.

When the plate materials 3, which are electromagnetic steel plates, are stacked so as to form the rotor core 2, blanking-type crimping is utilized. As illustrated in each of FIGS. 8 through 12, the crimping position 7 is situated more close to the radially inside of the rotor core 2 than the magnet 6 is. This is because when the crimping portion is provided at the radially outside of the magnet 6, in which the magnetic-pole portion 8 is formed, the magnetic resistance increases and hence the desired characteristics may not be obtained and because the dimension required to dispose the crimping portion cannot be secured.

Because when the crimping position 7 is provided more close to the radially inside of the rotor core 2 than the magnet 6 is, the magnetic resistance can be prevented from increasing due to blanking-type crimping, both maintaining/raising of the performance of the electric rotating machine and prevention of the expansion of the stacking gap between the plate materials 3 of the rotor core 2 can concurrently be realized.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present disclosure. For example, there are included the case where at least one constituent element is modified, added, or omitted and the case where at least one constituent element is extracted and then combined with constituent elements of other embodiments.

DESCRIPTION OF REFERENCE NUMERALS

1: rotor
2: rotor core
3: plate material
4: shaft
5: air gap
6: magnet
7: crimping position
9: central hole
10: second press-fitting portion
11: non-press-fitting portion
12: first press-fitting portion

What is claimed is:
1. An electric-rotating-machine rotor comprising:
a rotor core in which ring-shaped plate materials that are each magnetic materials are stacked in an axial direction; and
a shaft press-fitted into an inner circumferential surface of the rotor core,
wherein the inner circumferential surface has a first press-fitting portion that is an axial-direction section into which the shaft is inserted and a second press-fitting portion that is an axial-direction section adjacent to the first press-fitting portion and into which the shaft is inserted with an interference larger than that of the first press-fitting portion,
the shaft is press-fitted into the inner circumferential surface of the rotor core from the first press-fitting portion side,
the plate material of the rotor core has a recessed portion in one side thereof and a protruding portion at the other side thereof, and the recessed portion and the protruding portion of the respective plate materials that are adjacent to each other are fitted with and fixed to each other, the inner circumferential surface has a non-press-fitting portion that is an axial-direction section, that is situated opposite to the second press-fitting portion, that is adjacent to the first press-fitting portion, and that has an inner diameter larger than an outer diameter of the shaft, the ring-shaped plate materials are formed of a plurality of ring-shaped steel plate, each ring-shaped steel plate including a magnetic pole portion, and a first magnetic pole portion of a first ring-shaped steel plate in the first press-fitting portion presses down with force against a second magnetic pole portion of a second ring-shaped steel plate in the non-press-fitting portion, thereby reducing a vibration-induced noise caused by an axial-direction collision of magnetic pole portions during operation of an electric-rotating-machine comprising the electric-rotating-machine rotor.

2. The electric-rotating-machine rotor according to claim 1, wherein an air gap is provided in the rotor core in such a way as to be in parallel with the shaft, and a permanent magnet is inserted into the air gap.

3. The electric-rotating-machine rotor according to claim 1,
wherein an air gap is provided in the rotor core in such a way as to be in parallel with the shaft, and a permanent magnet is inserted into the air gap, and
wherein one end portion of the permanent magnet is provided in a region where the non-press-fitting portion exists in a radial direction of the rotor core.

4. The electric-rotating-machine rotor according to claim 1,
wherein an air gap is provided in the rotor core in such a way as to be in parallel with the shaft, and a permanent magnet is inserted into the air gap, and
wherein the recessed portion and the protruding portion of the plate material are provided more toward the radially inside thereof than the permanent magnet is.

5. An electric-rotating-machine rotor comprising:
a rotor core in which ring-shaped plate materials that are each magnetic materials are stacked in an axial direction; and
a shaft press-fitted into an inner circumferential surface of the rotor core,
wherein the inner circumferential surface has a first press-fitting portion that is an axial-direction section and presses the shaft and a second press-fitting portion that is an axial-direction section adjacent to the first press-fitting portion and presses the shaft with a pressure larger than that of the first press-fitting portion, and
wherein letting a direction from the first press-fitting portion to the second press-fitting portion be referred to as an axial-direction first side, a radially-inside end portion of the plate material in the first press-fitting portion is displaced more toward the axial-direction first side than a radially-outside end portion thereof is; a radially-inside end portion of the plate material in the second press-fitting portion is displaced more toward the axial-direction first side than a radially-outside end portion thereof is; a displacement amount of the second press-fitting portion is larger than that of the first press-fitting portion.

6. The electric-rotating-machine rotor according to claim 5, wherein the plate material of the rotor core has a recessed portion in one side thereof and a protruding portion at the other side thereof, and the recessed portion and the protruding portion of the respective plate materials that are adjacent to each other are fitted with and fixed to each other.

7. The electric-rotating-machine rotor according to claim 6, wherein the inner circumferential surface has a non-press-fitting portion that is an axial-direction section, that is situated opposite to the second press-fitting portion, that is adjacent to the first press-fitting portion, and that has an inner diameter larger than an outer diameter of the shaft.

8. The electric-rotating-machine rotor according to claim 7,
wherein an air gap is provided in the rotor core in such a way as to be in parallel with the shaft, and a permanent magnet is inserted into the air gap, and
wherein one end portion of the permanent magnet is provided in a region where the non-press-fitting portion exists in a radial direction of the rotor core.

9. The electric-rotating-machine rotor according to claim 6,
wherein an air gap is provided in the rotor core in such a way as to be in parallel with the shaft, and a permanent magnet is inserted into the air gap, and
wherein the recessed portion and the protruding portion of the plate material are provided more toward the radially inside thereof than the permanent magnet is.

10. The electric-rotating-machine rotor according to claim 5, wherein an air gap is provided in the rotor core in such a way as to be in parallel with the shaft, and a permanent magnet is inserted into the air gap.

11. A manufacturing method for an electric-rotating-machine rotor, comprising:
forming a first press-fitting portion by stacking ring-shaped first plate materials that are magnetic materials each of which has an inner diameter smaller than an outer diameter of a shaft,
forming a second press-fitting portion by stacking ring-shaped second plate materials that are magnetic materials each of which has an inner diameter smaller than that of the first plate material,
stacking the first press-fitting portion and the second press-fitting portion, and
press-fitting the shaft into the first press-fitting portion and the second press-fitting portion from the first press-fitting portion side,
wherein a plate material of the rotor core has a recessed portion in one side thereof and a protruding portion at the other side thereof, and the recessed portion and the protruding portion of the respective plate materials that are adjacent to each other are fitted with and fixed to each other,
an inner circumferential surface has a non-press-fitting portion that is an axial-direction section, that is situated opposite to the second press-fitting portion, that is adjacent to the first press-fitting portion, and that has an inner diameter larger than an outer diameter of the shaft,
the ring-shaped first plate materials and the ring-shaped second plate materials are formed of a plurality of ring-shaped steel plates, each ring-shaped steel plate including a magnetic pole portion, and
a first magnetic pole portion of a first ring-shaped steel plate in the first press-fitting portion presses down with force against a second magnetic pole portion of a second ring-shaped steel plate in the non-press-fitting portion, thereby reducing a vibration-induced noise caused by an axial-direction collision of magnetic pole portions during operation of an electric-rotating-machine comprising the electric-rotating-machine rotor.

* * * * *